(12) United States Patent
Rudy

(10) Patent No.: US 8,973,593 B1
(45) Date of Patent: Mar. 10, 2015

(54) VEGETATION-CONTAINING HUNTING BLIND

(76) Inventor: Christopher John Rudy, Fort Gratiot Township, St. Clair County, MI (US)

( * ) Notice: Subject to any disclaimer, the term of this patent is extended or adjusted under 35 U.S.C. 154(b) by 1189 days.

(21) Appl. No.: 10/443,430

(22) Filed: May 22, 2003

Related U.S. Application Data

(60) Provisional application No. 60/383,495, filed on May 24, 2002.

(51) Int. Cl.
    *E04H 15/00* (2006.01)

(52) U.S. Cl.
    USPC ............. 135/87; 135/96; 135/901; 43/1

(58) Field of Classification Search
    USPC ........ 135/87, 96, 901; 43/1, 2; 47/83, 44, 47
    See application file for complete search history.

(56) References Cited

U.S. PATENT DOCUMENTS

| | | | | |
|---|---|---|---|---|
| 951,807 A * | 3/1910 | Erdly | ............... | 47/29.5 |
| 1,780,950 A * | 11/1930 | Stevason | ............... | 47/31 |
| 2,816,297 A * | 12/1957 | Stanley | ............... | 114/351 |
| 2,827,729 A * | 3/1958 | Hoene | ............... | 43/1 |
| 2,982,290 A * | 5/1961 | Hunziker | ............... | 135/128 |
| 2,996,842 A * | 8/1961 | Weston | ............... | 47/30 |
| 3,193,852 A * | 7/1965 | Murrmann | ............... | 114/351 |
| 3,793,771 A * | 2/1974 | Slaughter | ............... | 47/44 |
| 4,265,261 A * | 5/1981 | Barker | ............... | 135/100 |
| 4,794,717 A * | 1/1989 | Horsmann | ............... | 43/1 |
| 4,825,578 A * | 5/1989 | Robinson | ............... | 43/1 |
| 4,858,380 A * | 8/1989 | Gayle | ............... | 47/45 |
| 5,010,909 A * | 4/1991 | Cleveland | ............... | 135/125 |
| 5,479,741 A * | 1/1996 | Underwood | ............... | 47/30 |
| 5,592,961 A * | 1/1997 | Chin | ............... | 135/125 |
| 5,605,008 A * | 2/1997 | Johnston et al. | ............... | 47/29.2 |
| 5,762,085 A * | 6/1998 | Punch | ............... | 135/93 |
| 5,842,495 A * | 12/1998 | Egnew et al. | ............... | 135/133 |
| 5,860,245 A * | 1/1999 | Welch | ............... | 47/56 |
| 5,930,948 A * | 8/1999 | Daniel | ............... | 47/23.1 |
| 5,983,913 A * | 11/1999 | Fargason | ............... | 135/93 |
| 6,000,171 A * | 12/1999 | Wotton | ............... | 47/44 |
| 6,088,953 A * | 7/2000 | Morgan | ............... | 47/31 |
| 6,145,528 A * | 11/2000 | Egnew et al. | ............... | 135/128 |
| 6,164,005 A * | 12/2000 | Copeland | ............... | 43/1 |
| 6,311,428 B1 * | 11/2001 | Marino et al. | ............... | 47/46 |
| 6,658,790 B2 * | 12/2003 | Skuba | ............... | 47/56 |
| 6,941,961 B1 * | 9/2005 | Eastman, II | ............... | 135/121 |
| 2001/0009158 A1 * | 7/2001 | O'Hare | ............... | 135/90 |
| 2003/0208953 A1 * | 11/2003 | McCamy | ............... | 47/23.2 |
| 2004/0079699 A1 * | 4/2004 | Engwer | ............... | 210/602 |
| 2005/0028854 A1 * | 2/2005 | Erickson et al. | ............... | 135/97 |

FOREIGN PATENT DOCUMENTS

GB    2258797 A  *  2/1993

* cited by examiner

*Primary Examiner* — Anita M King

(57) ABSTRACT

Vegetation-containing hunting blind includes a vegetation-shielding/offering member. Inside the member vegetation can be grown.

21 Claims, 3 Drawing Sheets

US 8,973,593 B1

VEGETATION-CONTAINING HUNTING BLIND

CROSS-REFERENCE TO RELATED APPLICATION INCLUDING A CLAIM OF DOMESTIC PRIORITY

This claims benefits under 35 USC 119(e) of U.S. provisional patent application No. 60/383,495 filed on May 24, 2002 A.D. The complete specification of that application is incorporated herein by reference.

BACKGROUND TO THE INVENTION

I. Field

This concerns a method of hunting and/or animal observation with a blind, which is capable of containing vegetation, as well as the blind for and/or with the vegetation, and the blind in kit form.

II. Known Art and Problems

Among known hunting blinds are two general types, the first and oldest being natural cover such as a thicket, bush or fern bed, or cut foliage and/or sticks piled up to shield the hunter; the second, artificial devices such as cloth tents and structures such as wooden shacks in which the hunter hides from his quarry. The first has a drawback of either being found in an undesirable location, or, when of the cut natural variety, often being out of place with respect to its site. The second can have drawbacks of being out of place in its setting, requiring carrying in and out for the hunt and/or being expensive. Certain quarry such as deer have a keen sense of smell and may detect and avoid a constructed or artificial blind. At best, in general and for the most part, such known blinds are neutral with respect to detection by smell.

It would be desirable to ameliorate if not overcome at least one, if not all, of such problems, and to improve the art.

A BRIEF SUMMARY WITH SEVERAL ILLUSTRATIVE EMBODIMENTS OF THE INVENTION

The invention provides a vegetation-containing hunting blind comprising a vegetation-shielding/offering member, inside which vegetation can be grown. The blind is useful in hunting. By the invention, significantly, one or more problem/s of the art is/are ameliorated if not overcome. Vegetation growing in the member can hide or mask the hunter, and moreover, may attract the quarry to the blind. Numerous further advantages attend the invention.

The present blind has a vegetation-shielding/offering member. As such, the member can shield vegetation or a part whereof from being consumed or at least control or restrict consumption of the vegetation by an animal; it may offer the vegetation or a part whereof for consumption or may entice an attempt at consumption or curiosity on the part of an animal, and preferably does so.

For example, pole beans may be grown as the vegetation on a framework that supports as a vegetation-shielding/offering member mesh such as so-called deer mesh, chicken wire, weaved twine, and so forth, with the framework inside the member. Framework may be present outside the member in addition to or in lieu of any inside framework. The system can be laid out in any suitable shape, say, as a straight wall, which may stand alone or which may be connected with another vegetation-containing wall or top, or which may be connected with matter that is not growing vegetation in such a manner such as a log pile, a tree stump, a trunk of a tree, a pallet, a wooden fence, an earthen hill, a shed, barn or garage, and so forth; in an L- or T-shape, a C- or G-shape or horseshoe, a spiral or an igloo pattern with or without windows, a serpentine or S- or Z-shape as viewed from the top, say, one foot or several feet or yards high and a foot or several feet or yards across, with the member in general forming a shield on one or two sides, say, inside and outside an enclosed shape to shield and/or offer the vegetation. So, in general, a shape when viewed from the top may be straight, bent or curvilinear, which may be inclusive of circular, or have both straight and curvilinear segments. The vegetation protected inside the member desirably grows densely enough to visibly shield a hunter inside the walls thus formed, and perhaps even mask his smell. As well, the vegetation, for example, the beans, may serve to attract such quarry as deer and rabbits, with some of the plant able to be nibbled as it may grow outside the member. The framework may be of inanimate objects such as wood, glass, metal and/or plastic supports, or it may be living, for example, corn. With plants such as corn or sunflowers, the blind may be self-erecting vertically as the plant, grown inside the member, pushes the member up with growth. The vertically growing plant may serve as a sole source of the vegetation, or another variety of plant such as pole beans or squash may be grown in conjunction with it. Thus, the framework may be biodegradable. The member also may be biodegradable. The blind may be so, too.

BRIEF DESCRIPTION OF THE SEVERAL VIEWS OF THE DRAWINGS

The drawings form part of the specification hereof. With respect to the drawings, which are not necessarily drawn to scale, the following is briefly noted.

Figure 1:
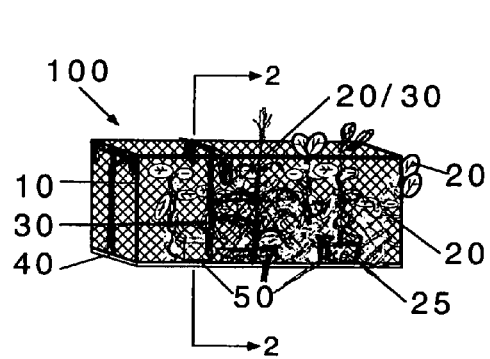
FIG. 1 is a side view of a vegetation-containing hunting blind of the present invention, in the form of a simple wall.
Figure 2:
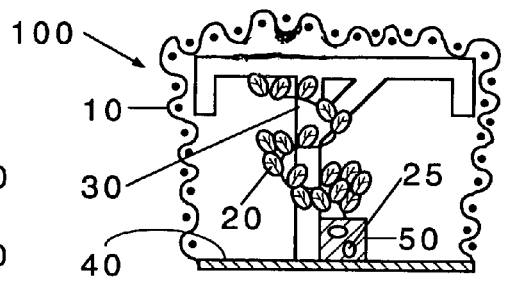
FIG. 2 is a sectional view of the blind of FIG. 1, taken along 2-2 in FIG. 1.
Figure 3:
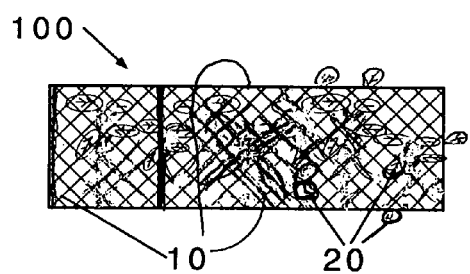
FIG. 3 is a top view of the blind of FIG. 1.
Figure 4:
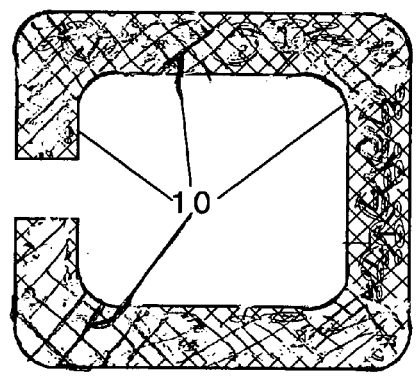
FIG. 4 is top plan view of another embodiment of the present invention, with the vegetation-containing blind generally in the form of a horseshoe or C-shaped form.
Figure 5:
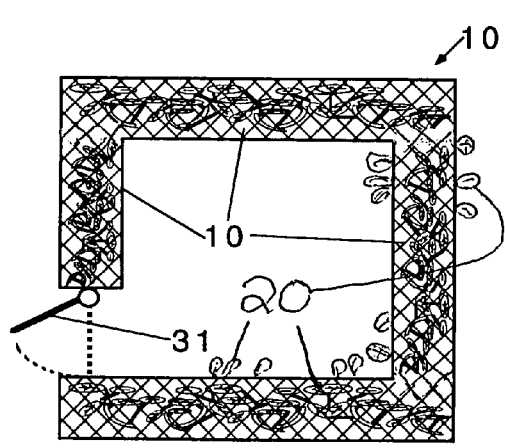
FIG. 5 is a top plan view of another C-shaped form embodiment of the invention, with a gate.
Figure 6:
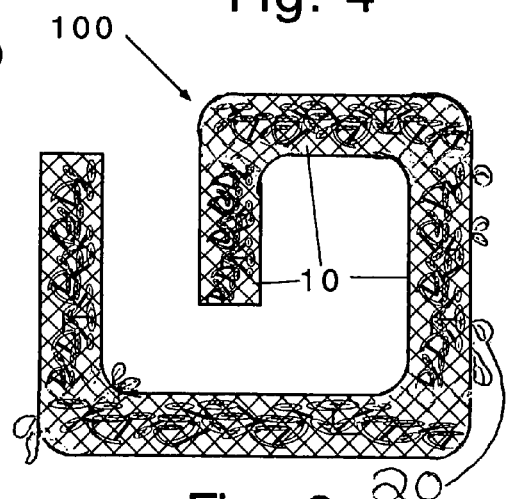
FIG. 6 is a top plan view of another embodiment of the invention, with the vegetation-containing blind generally in the form of a spiral.
Figure 7:
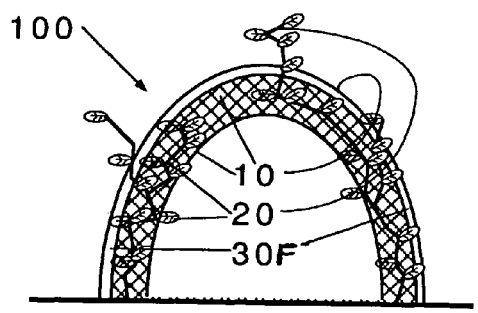
FIG. 7 is a side, sectional plan view of another embodiment of the invention, with the vegetation-containing blind including a top vegetation-containing cover, generally in an igloo shape.
Figure 8:
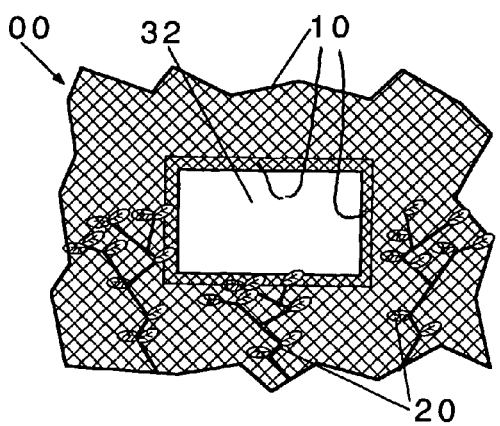
FIG. 8 is a side plan view of another embodiment of a vegetation-containing hunting blind of the invention, which shows detail with respect to a wall that has an opening or "window."
Figure 9:
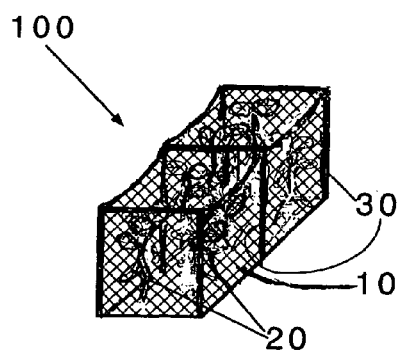
FIG. 9 is a plan view of another embodiment of the invention, which includes other framework.
Figure 10:
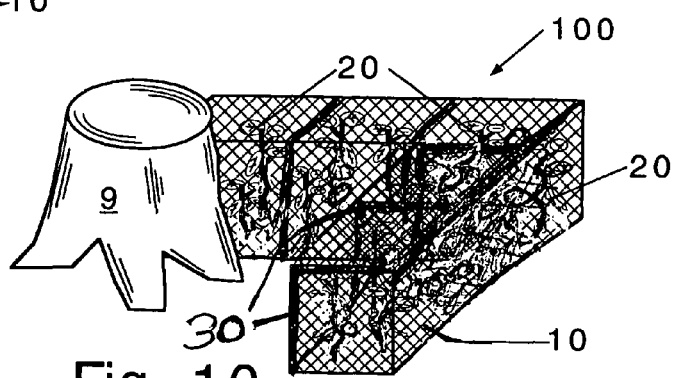
FIG. 10 is a plan view of another embodiment of the invention in which parts of the blind do not have vegetation in a member.
Figure 11:
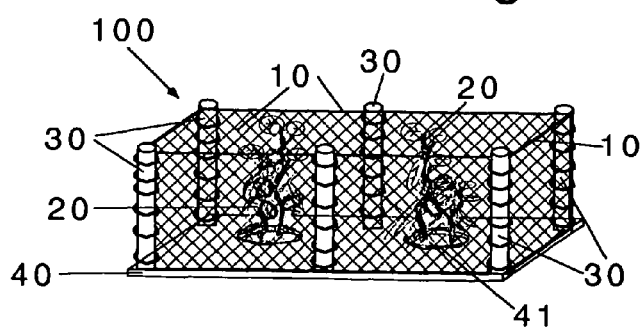
FIG. 11 is a plan view of another embodiment of the invention in a form of a fence construction.
Figure 12:
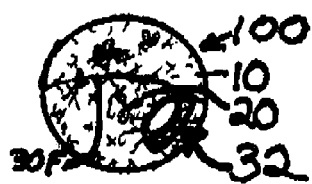
FIG. 12 is a top view of a blind hereof with a circular shape in an igloo form.
Figure 13:
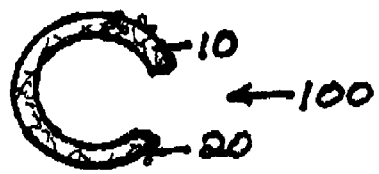
FIG. 13 is a top view of a blind hereof with another form of a C-shape.
Figure 14:
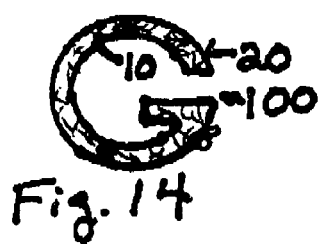
FIG. 14 is a top view of a blind hereof with a G-shape.
Figure 15:
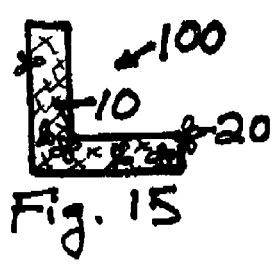
FIG. 15 is a top view of a blind hereof with an L-shape.
Figure 16:
FIG. 16 is a top view of a blind hereof with a T-shape.
Figure 17:
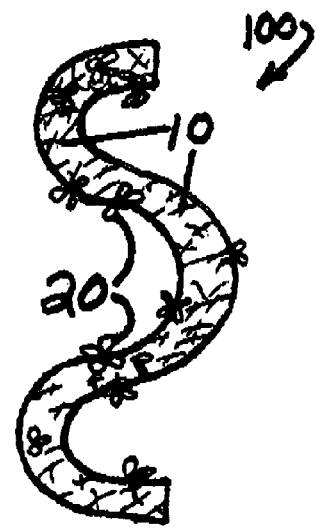
FIG. 17 is a top view of a blind hereof with a serpentine shape.
Figure 18:
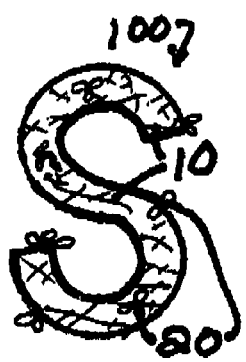
FIG. 18 is a top view of a blind hereof with an S-shape.
Figure 19:
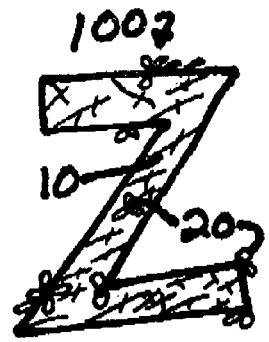
FIG. 19 is a top view of a blind hereof with a Z-shape.
Figure 20:
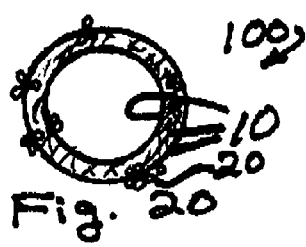
FIG. 20 is a top view of a blind hereof in a circular shape such as otherwise of an igloo as of FIG. 7 or 12 without an igloo top, i.e., in an O-shape.
Figure 21:
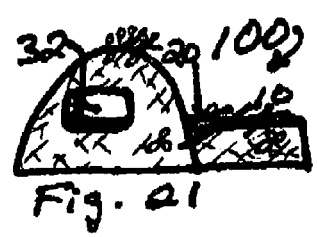
FIG. 21 shows a blind hereof with igloo shape attached to a straight shape.

A DETAILED DESCRIPTION OF THE INVENTION, FOR THE MOST PART WITH REFERENCE TO THE DRAWINGS

Now, the invention can be further understood by the following detail, which may be read in view of the drawings. Such is to be taken in an illustrative and not necessarily limiting sense.

With respect to the drawings, vegetation-containing hunting blind 100, which may stand alone or may adjoin a tree stump 9, includes vegetation-shielding/offering member 10, for example, plastic deer mesh (DuPont); woven plant fibers such as flax, hemp, corn stalk fiber, cedar root, willow boughs; chicken wire, chain link fence; and so forth and the like. Inside the member 10 can be grown seasonal vegetation 20 such as pole beans, pumpkins, squash, gourds, cucumbers, corn, sunflowers, tomatoes, potatoes, bush beans, lettuce, sugar beets, carrots, parsley, peas, Swiss chard, mint, and so forth. Framework 30 may be provided inside and/or outside the member 10, and may be formed from suitable metal, glass, plastic, wood, wood or composite, paper, papier mache or the like material. The vegetation 20 may serve as the framework 30, itself, or in combination with other framework. Along such lines, natural sticks or last season's corn or sugar cane stalks may serve as the framework 30. The framework may be a flexible tent pole 30F. A gate 31 may be provided. A window 32 may be provided, say, by rolling a mesh piece between walls. Ground cover 40, for example, a cloth, or substitute such as a board, gravel, wood chips, and so forth and the like, may be placed on the ground to control weeds, and vegetation starter 50 such as sphagnum moss, loose or pressed peat, leaves or paper, potting soil, vermiculite, sand, clay, stone, and so forth may be employed, with fertilizer if desired. The ground cover 40 may be embodied, for example, as wood or concrete with planter holes 41 therein. Seed 25 may be provided in the starter 50 in a ready-to-use kit.

To use the blind, a site is chosen, and prepared if needed. The blind can be set up by ordinary methods. For example, any ground cloth 40 may be first laid down, followed by set up of a framework, say, of T- or upside down U-shaped wood, plant stalks, metal or plastic; seed 25 and/or starter 50, if not provided with the ground cover 40 as a subunit, may be sown and/or emplaced; and the member 10 draped over the framework 20. As another example, ground that will be inside the member 10 can be spaded and planted with suitable seed 25, and framework 20 and a member 10 can be set up over the seed 25. A chain-link fence system may form all or a part of the member 10 and framework 20, and be more permanently installed for vegetative growth and annual hunts. A concrete or treated wood board, say, with predetermined holes or planters for the seed 25 may serve as a more permanent ground cover 40.

When set up and grown, BANG! There's game and a fresh vegetable dish to boot! Of course, the blind of the invention could be used for photography or simple animal-watching as well.

CONCLUSION TO THE INVENTION

The present invention is thus provided. Various features, parts, subcombinations and combinations can be employed with or without reference to other features, parts, subcombinations or combinations in the practice of the invention, and numerous adaptations and modifications can be effected within its spirit, the literal claim scope of which is particularly pointed out as follows:

I claim:

1. A hunting or animal observation blind that is capable of containing a vegetation component of vegetation, which comprises a vegetation-shielding/offering member, which at least bounds an interior volume such that the vegetation-shielding/offering member is capable of keeping a contemplated game animal from entering into said volume to eat the vegetation component that is capable of being grown therein, which is capable of allowing at least a portion of the vegetation component to pass therethrough to be offered for eating outside said volume by the contemplated game animal, and which forms a wall including spaced apart sides so as to define a first side, a second side spaced apart from and opposite the first side so that said first and second sides are in a spaced apart relationship with respect to each other to form said volume, a horizontal length and a horizontal width, and so as to bound said volume, wherein said wall has one and only one of shapes "A" or "F" or one or more of shapes "B" through "E," as follows, when taken from a top view:

(A) said wall is straight when viewed from the top, and elongate when viewed from the top so that its length is substantially greater in linear dimension than its width;

(B) said wall includes being bent by including a bend, being inclusive of a plurality of segments when viewed from the top, at least a first segment of which goes along a first horizontal axis and at least a second segment of which intersects with the first segment and goes along a second horizontal axis different from the first horizontal axis, and which has at least one elongate segment thereto when viewed from the top so that its length, which pertains to the at least one elongate segment of the bent wall, is substantially greater in linear dimension than its width, which pertains to the at least one elongate segment of the bent wall;

(C) said wall is curvilinear but not substantially circular by including at least one curvilinear segment when viewed from the top, and which is elongate when viewed from the top so that its length, which pertains to the at least one curvilinear segment is substantially greater in linear dimension than its width, which pertains to the at least one curvilinear segment;

(D) said wall includes straight and curvilinear segments, at least one of which is elongate when viewed from the top so that its length, which pertains to at least one of the straight and curvilinear segments, is substantially greater in linear dimension than its width, which pertains to the at least one of the straight and curvilinear segments;

(E) said wall includes formation of an igloo shape, in which said wall includes a top cover that is capable of containing the vegetation component and includes as said first and second spaced apart sides and top cover, outer and inner sides to define said interior volume of said wall of the igloo shape, between which outer and inner sides the vegetation component is capable of being grown, and which igloo shape has an inner confine defined by said inner sides, into which inner confine a man can enter; or (F) said wall is substantially circular when viewed from the top, and there is present at least one of the following features:
  (i) the blind forms with said walls said igloo shape;
  (ii) the wall has a vacant window therethrough, which is formed by providing a mesh piece between opposing portions of said spaced apart first and second sides of said wall, which mesh piece spans said opening portions of said first and second spaced apart sides of said wall;
  (iii) a gate encloses an opening otherwise present between ends of said wall, through which when opened a man may enter; and
  (iv) the blind includes as said first and second spaced apart sides, outer and inner sides to define said interior volume of said wall of said circular shape, between which outer and inner sides the vegetation component is capable of being grown, and which substantially circular shape has an inner confine defined by said inner sides, into which inner confine a man can enter— characterized in that the blind can be used for hunting or observation of the contemplated game animal by providing the blind; setting up the blind on a predetermined site; providing the vegetation component in said interior volume, which attracts said animal; hiding or masking oneself behind said member; and observing for said animal.

2. The blind of claim 1, further comprising in combination with the blind and disposed at least in part in said volume of the wall of the blind, the vegetation that is capable of being grown in said volume of the wall of the blind, which is an annual plant that is attractive to the game animal.

3. The blind of claim 2, wherein the following features are present:
  said member also bounds a top of said volume;
  said member includes a flexible mesh; and
  the blind includes at least one of a seed starter and a ground cover.

4. The blind of claim 2, wherein a framework supports said member.

5. The blind of claim 4, wherein the vegetation-shielding/offering member is a flexible mesh; and said wall, when viewed from the top, is the shape(s) B, C and/or D, or is the shape F(iii) or F(iv), and does not form the igloo.

6. The blind of claim 2, wherein said vegetation includes pole beans, and said game animal is a deer.

7. The blind of claim 6, wherein a framework supports said member.

8. The blind of claim 7, wherein the vegetation-shielding/offering member is a flexible mesh; and said wall, when viewed from the top, is the shape(s) B, C and/or D, or is the shape F(iii) or F(iv), and does not form the igloo.

9. The blind of claim 6, wherein the following features are present:
  said member also bounds a top of said volume;
  said member includes a flexible mesh; and
  the blind includes at least one of a seed starter and a ground cover.

10. The blind of claim 1, wherein a framework supports said member.

11. The blind of claim 10, wherein the vegetation-shielding/offering member is a flexible mesh; and said wall, when viewed from the top, is the shape(s) B, C and/or D, or is the shape F(iii) or F(iv), and does not form the igloo.

12. The blind of claim 1, wherein the following features are present:
  said member also bounds a top of said volume;
  said member includes a flexible mesh; and
  the blind includes at least one of a seed starter and a ground cover.

13. The blind of claim 1, wherein:
  the vegetation-shielding/offering member is a flexible mesh;
  said wall, when viewed from the top, is the shape(s) B, C and/or D, or is the shape F(iii) or F(iv), and does not form the igloo;
  a framework for support of the member is present; and
  a ground cover for said volume is present.

14. The blind of claim 1, wherein said wall is in a form selected from the group consisting of a horseshoe shape, a C-shape, a G-shape, a spiral shape, a serpentine shape, an S-shape, a Z-shape, a T-shape, an O-shape, and an L-shape, when taken from a top view.

15. The blind of claim 1, wherein at least one of the following features is present:
  the vegetation-shielding/offering member is a flexible mesh;
  a framework for support of said member is present; and
  a ground cover for said volume is present; and
wherein at least one of the following features is also present:
  said wall has a vacant window therethrough, which is formed by providing mesh between and spanning opposing portions of said spaced apart first and second sides of said wall, which mesh piece spans opposing portions of said first and second spaced apart sides of said wall;
  the blind is in the igloo shape; and
  a gate encloses an opening otherwise present between ends of said wall, through which when opened a man may enter.

16. A kit for provision of an erected hunting or animal observation blind that is able to contain vegetation having a vegetation component, which comprises:
  (I) a vegetation-shielding/offering member, which:
    (A) is able to be formed to bound an interior volume of a wall in air above ground, the wall having at least a first side and a second side opposite the first side so that said first and second sides can be set up in a spaced apart relationship with respect to each other to form the interior volume, so as to define the first side, the second side spaced apart from and opposite the first side, a horizontal length and a horizontal width, as so as to bound said volume, wherein said wall has one and only one of shapes "i" or "vi" or one or more of shapes "ii" through "v," when taken from a top view:
      (i) said wall is straight when viewed from the top, and elongate when viewed from the top so that its length is substantially greater in linear dimension than its width;
      (ii) said wall is bent by including a bend, being inclusive of a plurality of segments when viewed from the top, at least a first segment of which goes along a first horizontal axis and at least a second segment of which intersects with the first segment and goes along a second horizontal axis different from the first horizontal axis, and which has at least one elongate segment thereto when viewed from the top so that its length, which pertains to the at least one elongate segment of the bent wall, is substantially greater in linear dimension than its width, which pertains to the at least one elongate segment of the bent wall;

(iii) said wall is curvilinear but not substantially circular by including at least one curvilinear segment when viewed from the top, and which is elongate when viewed from the top so that its length, which pertains to the at least one curvilinear segment is substantially greater in linear dimension than its width, which pertains to the at least one curvilinear segment;

(iv) said wall includes straight and curvilinear segments, at least one of which is elongate when viewed from the top so that its length, which pertains to at least one of the straight and curvilinear segments, is substantially greater in linear dimension than its width, which pertains to the at least one of the straight and curvilinear segments;

(v) said wall includes formation of an igloo shape, in which said wall includes a top cover that is capable of containing the vegetation component and includes as said first and second spaced apart sides and top cover, outer and inner sides to define said interior volume of said wall of the igloo shape, between which outer and inner sides the vegetation component is capable of being grown, and which igloo shape has an inner confine defined by said inner sides, into which inner confine a man can enter; or (vi) said wall is substantially circular when viewed from the top, and there is present at least one of the following features:

(a) the blind forms with said walls said igloo shape;

(b) the wall has a vacant window therethrough, which is formed by providing a mesh piece between opposing portions of said spaced apart first and second sides of said wall, which mesh piece spans said opening portions of said first and second spaced apart sides of said wall;

(c) a gate encloses an opening otherwise present between ends of said wall, through which when opened a man may enter; and (d) the blind includes as said first and second spaced apart sides, outer and inner sides to define said interior volume of said wall of said circular shape, between which outer and inner sides the vegetation component is capable of being grown, and which substantially circular shape has an inner confine defined by said inner sides, into which inner confine a man can enter;

(B) is able to keep a contemplated game animal from entering into the interior volume and to offer vegetation to the animal therethrough, into which volume of the wall the vegetation component is able to be grown; and (C) includes flexible mesh;

(II) a framework for support of the member in addition to the vegetation-shielding/offering member; and (III) seed— characterized in that the blind that can be erected from the kit can be used for hunting or observation of the contemplated game animal by providing the blind; setting up the blind on a predetermined site; providing the vegetation component in said interior volume, which attracts said animal; hiding or masking oneself behind said member; and observing for said animal.

17. The kit of claim 16, wherein the seed includes bean seed.

18. The kit of claim 16, wherein the flexible mesh includes deer mesh, and at least one of a seed starter and a ground cover is also provided.

19. A method for hunting or observation of a contemplated animal quarry, which comprises:

providing a hunting or animal observation blind that is capable of containing a vegetation component of vegetation, which blind includes a vegetation-shielding/offering member that bounds at least sides of an interior volume and is such that it is capable of keeping the quarry from entering into the interior volume, into which volume the vegetation component is capable of being grown;

setting up the blind on a predetermined site;

providing the vegetation component to the interior volume, which attracts the quarry;

hiding or masking oneself behind said member; and observing for the quarry.

20. The method of claim 19, wherein the vegetation component provided in the interior volume is provided by growing vegetation from the ground.

21. The method of claim 20, wherein the vegetation component includes beans.

* * * * *